2 Sheets—Sheet 1.

T. SANDS.

Machine for Making Knitting Needles.

No. 1,821. Reissued Nov. 15, 1864.

Fig. I.

Witnesses:
L. F. Thomas
Geo. H. Ott

Inventor:
Thomas Sands

N. PETERS, Photo-Lithographer, Washington, D. C.

2 Sheets—Sheet 2.

T. SANDS.

Machine for Making Knitting Needles.

No. 1,821. Reissued Nov. 15, 1864.

Witnesses:
L. S. Thomas
Wm. H. Bell

Inventor:
Thomas Sands

N. PETERS, Photo-Lithographer, Washington, D. C.

UNITED STATES PATENT OFFICE.

THOMAS SANDS, OF GILFORD, NEW HAMPSHIRE.

MACHINE FOR MAKING KNITTING-NEEDLES.

Specification forming part of Letters Patent No. 38,987, dated June 23, 1863; antedated June 10, 1863; Reissue No. 1,821, dated November 15, 1864.

*To all whom it may concern:*

Be it known that I, THOMAS SANDS, of Gilford, in the county of Belknap and State of New Hampshire, have invented an Improvement in Machines for Making Machine Knitting-Needles; and I do hereby declare that the following is a full and exact description of the machine and the manner of using the same, reference being had to the accompanying drawings, making a part of this specification.

My machine is intended for saving a great part of the labor that has heretofore been required for making machine knitting-needles by hand, and is so constructed that the several operations of carrying the steel wire forward to the block, making the eye, slabbing down the wire to the proper shape and taper of the barb, and cutting off the length suitable for a needle are all performed automatically, and the needles are dropped into the box ready for the hands of the polisher. I also straighten the wire in the same machine as it is unwound from the reel, but this, of course, can be done previously in longer pieces, and the pieces cut off of a proper length for feeding to the machine. The machine is about three feet in length and about two and a half in width.

Figure 1:
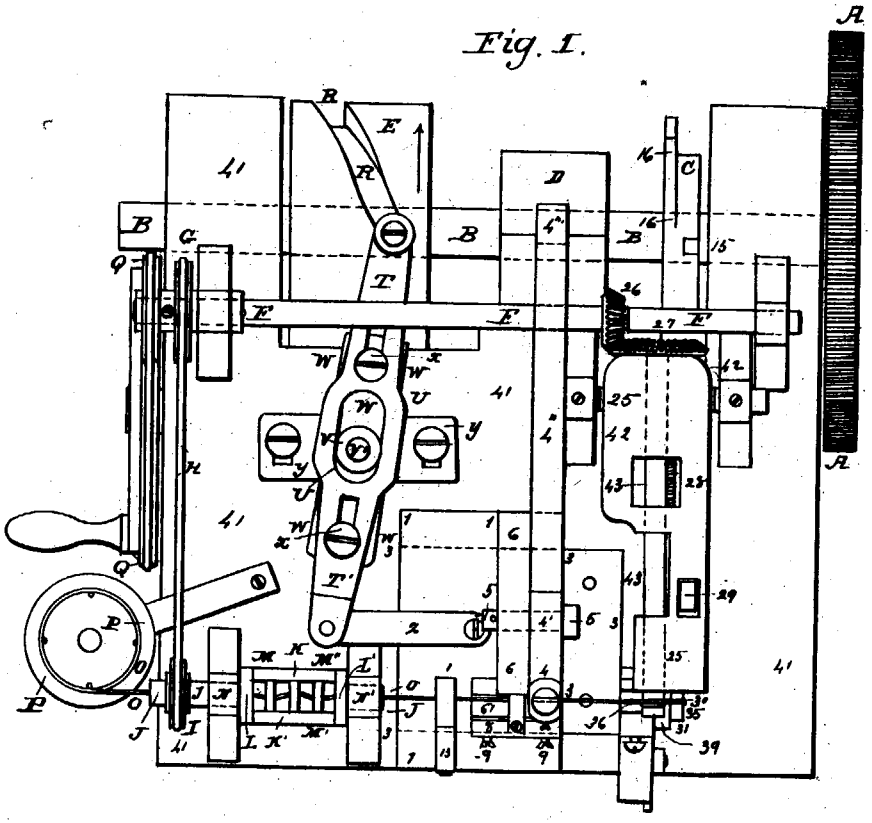

The power is applied by a small pinion which drives the large gear A, Figure 1 and gives a steady and uniform motion to the shaft B, which extends the whole length of the machine, and revolves in the direction shown by the arrow in suitable bearings placed at opposite sides of the frame. Attached to the horizontal shaft B are three cams, C, D, and E, their shape, as seen in the side views, Figs. 2, 3, and 4, being such as to produce the required movements of the three principal groups of mechanism. A horizontal counter-shaft, F, extends across the top of the machine and is driven by band from the pulley Q. It carries a small grooved pulley, G, which, by means of the band H, drives the pulley I and gives rotary motion to the wire-straightener, which consists of a short tube, J, turning in the bearings N N′, and having at its central part a rectangular frame, K K′ L L′, across which extend three bars having holes (placed out of line with each other) for the passage of the wire O. When the machine is in action, the steel wire passes from the reel P into one end of the hollow shaft J and issues at the other end of the shaft perfectly straight and in readiness to be formed into needles.

Figure 4:
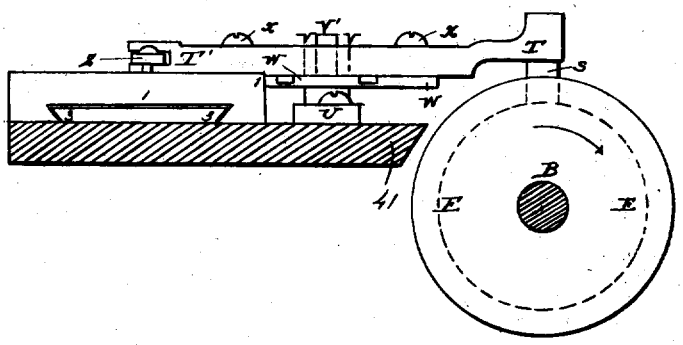

I will first describe the mechanism represented in Figs. 1 and 4, by which the wire O is carried forward from the straightener to the parts that punch the eye and scarf down and cut off the needle. In the scroll-cam E a recess or groove, R, is cut in such a curved form as will give lateral motion to the stud S, which plays within it, and is attached to one end, T, of the horizontal arm or lever T T′. There is an elongated slot, U, about the middle of the lever T T′, which receives a roller, V, that turns on a stud or fulcrum-pin, V′, projecting upward from a plate, Y, attached to the table 41 by screws passing through slots, so that the said plate can be shifted to set the fulcrum-pin to any desired distance from the end of the lever T T′, to vary the range of motion of the arm T′ of the lever, according to the length of needles desired to be made; but as the fulcrum-roller V can be shifted in the slot U of the lever T T′ it is necessary, when shifted and set, to prevent the lever from having end play when in operation. For this purpose there is a plate, W, below the lever, and secured to it by screws X X′, which pass through elongated slots, and this plate W is fitted to turn freely, but accurately, on the fulcrum-roller, so that when the plate Y, with the fulcrum-pin and roller, are shifted, the lever must be correspondingly shifted on the plate W′.

By this arrangement of the several parts the end T′ of the lever is made to communicate a greater or less traverse to the short connecting-link Z, which moves the sliding platform 1, being fastened to it by the pivot 2. This platform slides upon the dovetailed rail or bar 3, the greatest length of its traverse being equal to the length of the longest needle required to be made.

Figure 3:
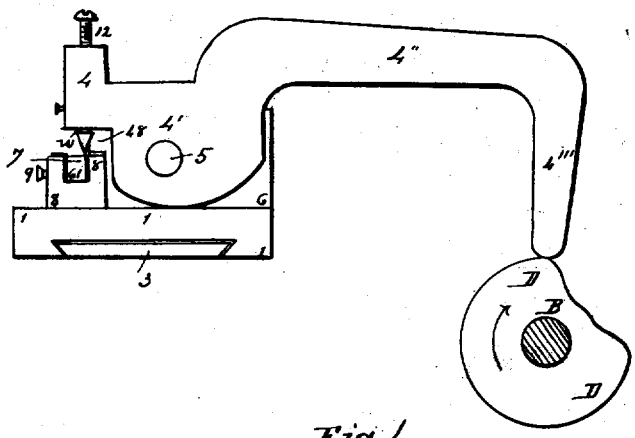

I will now describe the parts that are connected with the middle cam, D, as represented in Figs. 1 and 3. It is affixed to the shaft B, and when turned raises and lowers the bent lever 4 4′ 4″ 4‴ the requisite distance to punch the eye of the needle and at the proper intervals of time. This bent lever 4 has its fulcrum at the pin 5, which passes through the lever and the stand 6, the stand being supported by the sliding platform 1 and moving with it. The vertical part 4''' is always over some part of the broad cam D, which must be of sufficient length to allow the lever to travel over it, as it (the lever) moves with the platform to move the wire to the cutter, and the opposite end 4 is over the anvil or block 61, upon which the needle-wire O rests, being supported in a longitudinal groove, 7, upon its face. This block stands in a holding-block, 8, and is kept firmly in place by the set-screws 9 9'.

The punch that forms the eye is shown at 48, the end being formed in the exact shape required to cut into and spread the metal to form the eye. A vertical stem, 11, rises from it and is very accurately fitted into the enlarged head of the lever 4. Through the top of this head a screw, 12, plays by which the height of the punch is adjusted. A guide, 13, is attached to the top board, 41, and gives support to the wire O as it moves from the hollow tube J to the block 61.

Figure 2:
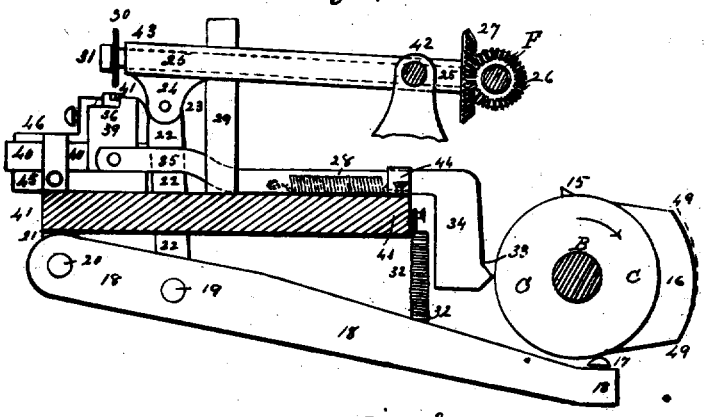

The apparatus for cutting or slabbing the wire down to the proper size and taper, and also for cutting off the length required for a needle, is shown in Figs. 1 and 2. The cam 16 is fastened to the shaft B and revolves in contact with the friction-slide 17, that projects from one end of the lever 18. This lever has the fulcrum 20 at its opposite end, where it is supported by the stud 21, that is secured to the table 41. The friction-slide 17 is held in contact with the cam by the spiral spring 32. A pitman, 22, is connected by pivots 19 and 23 with the lever 18 and knob 24 on the under side of a horizontal flat lever, 25. A hole is bored through the center of this lever 25, within which the shaft 43 revolves, being driven by the counter-shaft F, and the miter-gears 26 and 27. The lever is hung on centers at 42 42', and its front end carries a small burr-cutter wheel, 30, grooved on its periphery, and which is made fast to the end of the shaft 43, secured thereto by a nut, 31. An upright stud, 29, rises from the table of the machine and passes through a rectangular slot in the lever, serving to keep it steady as the cutter rises and falls. A small piece of iron, 36, is fitted to a bed-piece that rests upon the table 41. A hole through one end of it steadies the wire O, while the other is beveled down to allow the cutter or burr-wheel to come in contact with the wire.

The apparatus for cutting off the wire to the proper length for a needle is constructed as described below. A cam, C, (in contact with cam 16,) is affixed to the shaft B and carries a short projecting stud or wiper, 15. This comes in contact at each revolution with the part 33, that projects from the vertical part 34 of the sliding bar 34 35. This bar is thus moved forward horizontally, traversing in guides or slides 44 45 40 46 and forces the cutter 39 against the wire, cutting it off to the length required. The slide is brought back and held in contact with the cam by the spiral spring 28.

Having described the several parts of my machine, I will now explain the operation of the same when in use.

The steel wire is coiled upon the reel and the free end of it is inserted in the tube of the wire-straightener and led through the bars to the eye-block, where the punch is brought down upon it. The sliding platform 1, upon which the eye-making apparatus is supported, is now at the left end of the rail 3. As the cam E revolves the slot R moves the lever T T', and the connecting-rod Z, which pushes the platform to the right and draws the wire O through the straightener, the part 4''' of the eye-punch lever traversing at the same time across the breadth of the cam D. As the bent lever falls into the cavity of the cam D the punch rises, but previous to this the wire has been carried forward to the cutter 30, where it is slabbed down to the right taper by the parts represented in Fig. 2. The cam 16 depresses the lever 18 and draws down the pitman and swing-lever 25. This brings down the circular cutter 30, which is constantly rotating, and reduces the end of the needle to the desired shape, its section being nearly oval. The projection 15 on the cam C now comes in contact with the slide-bar 34, moves the sliding plate 39, and cuts off the length required for a needle. This length is fixed by adjusting the sliding fulcrum of the lever T, so that it will give a greater or less traverse to the sliding table. The needles are now in condition to go to the finisher, in whose hands they are polished and the hook bent to the required form for use in a knitting-machine.

In Fig. 2 the line 49 shows the form of the face of the cam 16, the distance of the face from the center of motion being greatest at the beginning of the stroke. This depresses the burr-cutter to the lowest point where it begins to cut or slab down the wire at its extreme end, and the gradually-decreasing radius of the cam permits the burr-cutter to rise gradually as the wire is moved forward, so as to give the required taper to the needle. It will be perceived that by varying the face of the cam the taper of the needle may be changed, or it may be made to cut away the steel at any part of the length, and thus give any form required to the needle.

I have shown an apparatus for straightening the wire as it is reeled off to be fed into the machine; but this apparatus need not necessarily be attached to the machine unless it is desired to have all the operations conducted at the same time under the eye of the same attendant. Where wire of suitable lengths already straightened is used, the straightening-frame may be omitted.

What is termed the "eye" of a machine knitting-needle is not a perforation through the metal, but a cavity pressed to receive the point or barb, sometimes termed the "beak," of the needle, that the previously-formed loop of the fabric which is on the body of the needle may be passed over the barb or beak and over the newly-formed loop which is within the barb or beak.

I claim as my invention and desire to secure by Letters Patent in machinery for forming machine knitting-needles—

1. The burr, or equivalent cutter, for slabbing that part of the wire which is to form the barb or beak of the needle, in combination with the means, or the equivalent thereof, for holding the wire by the eye which has been formed, substantially as described, that the flattening of the wire by the burr, or equivalent cutter, may be in proper relation to the eye.

2. The combination, substantially as described, of the means for forming the eye, the means for slabbing that part of the wire which is to form the barb or beak of the needle, and the means for cutting off the wire, substantially as described.

3. The combination, substantially as described, of the means for straightening the wire, the means for forming the eye, and the holding the wire by the eye, the means for slabbing, and the means for cutting off the wire, substantially as and for the purposes specified.

4. The combination, substantially as described, of the bed or block on which the wire is supported during the operation of slabbing the burr, or equivalent cutter, for slabbing the wire, the means described, or the equivalent thereof, for causing the burr cutter to act upon the wire in the direction of its length, and a cam or equivalent pattern to determine the motions of the burr or equivalent cutter toward and from the wire to determine the form of the slabbing.

THOMAS SANDS.

Witnesses:
THOS. J. WHIPPLE,
ERASTUS P. JEWELL.